United States Patent
Zhang et al.

(10) Patent No.: US 12,512,893 B2
(45) Date of Patent: Dec. 30, 2025

(54) RATE MATCHING AND BEAM MEASUREMENT FOR INTER-CELL BEAM MANAGEMENT AND INTER-CELL MULTI-TRP OPERATION

(71) Applicant: APPLE INC., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Seyed Ali Akbar Fakoorian, San Diego, CA (US); Wei Zeng, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 91 days.

(21) Appl. No.: 18/706,466

(22) PCT Filed: Nov. 5, 2021

(86) PCT No.: PCT/CN2021/129070
§ 371 (c)(1),
(2) Date: May 1, 2024

(87) PCT Pub. No.: WO2023/077449
PCT Pub. Date: May 11, 2023

(65) Prior Publication Data
US 2025/0015866 A1    Jan. 9, 2025

(51) Int. Cl.
*H04W 24/10*    (2009.01)
*H04B 7/06*    (2006.01)
(Continued)

(52) U.S. Cl.
CPC ....... *H04B 7/06952* (2023.05); *H04L 1/0067* (2013.01); *H04W 72/23* (2023.01)

(58) Field of Classification Search
CPC .............. H04W 24/10; H04W 72/231; H04W 36/0058; H04W 36/085; H04W 16/28;
(Continued)

(56) References Cited

U.S. PATENT DOCUMENTS

| 2021/0014837 A1* | 1/2021 | Papasakellariou .... H04L 5/0053 |
| 2022/0303081 A1* | 9/2022 | Sun ........................ H04L 5/0035 |

(Continued)

FOREIGN PATENT DOCUMENTS

| WO | 2021033115 A1 | 2/2021 |
| WO | 2021055180 A1 | 3/2021 |

OTHER PUBLICATIONS

Intel Corporation, "On multi-TRP/multi-panel transmission", R1-1910668, 3GPP TSG RAN WG1 Meeting #98b, Chongqing, China, Agenda Item 7.2.8.2, Oct. 14-20, 2019, 15 pages.
(Continued)

*Primary Examiner* — Eva Y Puente
(74) *Attorney, Agent, or Firm* — Dorsey & Whitney LLP

(57) ABSTRACT

Inter-cell beam management and inter-cell multiple transmission and reception point (multi-TRP) operation may include decoding a cell-specific reference signal (CRS) pattern list configuration received from a base station. The CRS pattern list configuration may include one or more CRS pattern lists. Each of the one or more CRS pattern lists correspond to one or more cells of a plurality of cells configured by the base station. Beam management associated with the plurality of cells may be performed based on the CRS pattern list configuration.

20 Claims, 5 Drawing Sheets

(51) Int. Cl.
   *H04L 1/00* (2006.01)
   *H04W 72/23* (2023.01)
(58) Field of Classification Search
   CPC . H04W 36/0085; H04W 72/23; H04W 24/08; H04L 5/0053; H04L 5/0048; H04L 5/001; H04L 5/0023; H04L 5/0094; H04L 5/0035; H04L 5/0051; H04L 1/1812; H04L 5/0098; H04B 7/06964; H04B 7/0695; H04B 7/088; H04B 7/024; H04B 7/06968; H04B 7/06952; H04B 7/0626; H04B 7/0408
   See application file for complete search history.

(56) References Cited

U.S. PATENT DOCUMENTS

| | | | | |
|---|---|---|---|---|
| 2022/0322310 | A1* | 10/2022 | Laddu | H04W 72/23 |
| 2022/0416977 | A1* | 12/2022 | Farag | H04W 52/42 |
| 2022/0417909 | A1* | 12/2022 | Zhu | H04L 5/005 |
| 2024/0235780 | A1* | 7/2024 | Zhang | H04L 5/0035 |
| 2025/0287326 | A1* | 9/2025 | Jung | H04W 52/367 |

OTHER PUBLICATIONS

Intel Corporation, "UE capability of NR to UTRA-FDD CELL_DCH CS handover", R2-2100385, 3GPP TSG-RAN WG2 Meeting #113-e, Electronic, Change Request 38.306, CR 0485, Current version 16.3.0, Jan. 25-Feb. 5, 2021, 30 pages.

Ericsson, "[Post109bis-e][933][eMIMO] RRC Open Issues (Ericsson)", Tdoc R2-2004465, 3GPP TSG-RAN WG2 Meeting #110e, Agenda Item 6.16.2, Jun. 1-12, 2020, 50 pages.

Huawei, Hisilicon, "Enhancements on Multi-TRP/panel transmission", R1-1908066, 3GPP TSG RAN WG1 Meeting #98, Prague, Czech Republic, Agenda Item 7.2.8.2, Aug. 26-30, 2019, 23 pages.

PCT/CN2021/129070, International Search Report and Written Opinion, Jul. 26, 2022, 8 pages.

* cited by examiner

RATE MATCHING AND BEAM MEASUREMENT FOR INTER-CELL BEAM MANAGEMENT AND INTER-CELL MULTI-TRP OPERATION

TECHNICAL FIELD

This application relates generally to wireless communication systems, including inter-cell beam management and inter-cell multi-TRP operation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mm Wave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
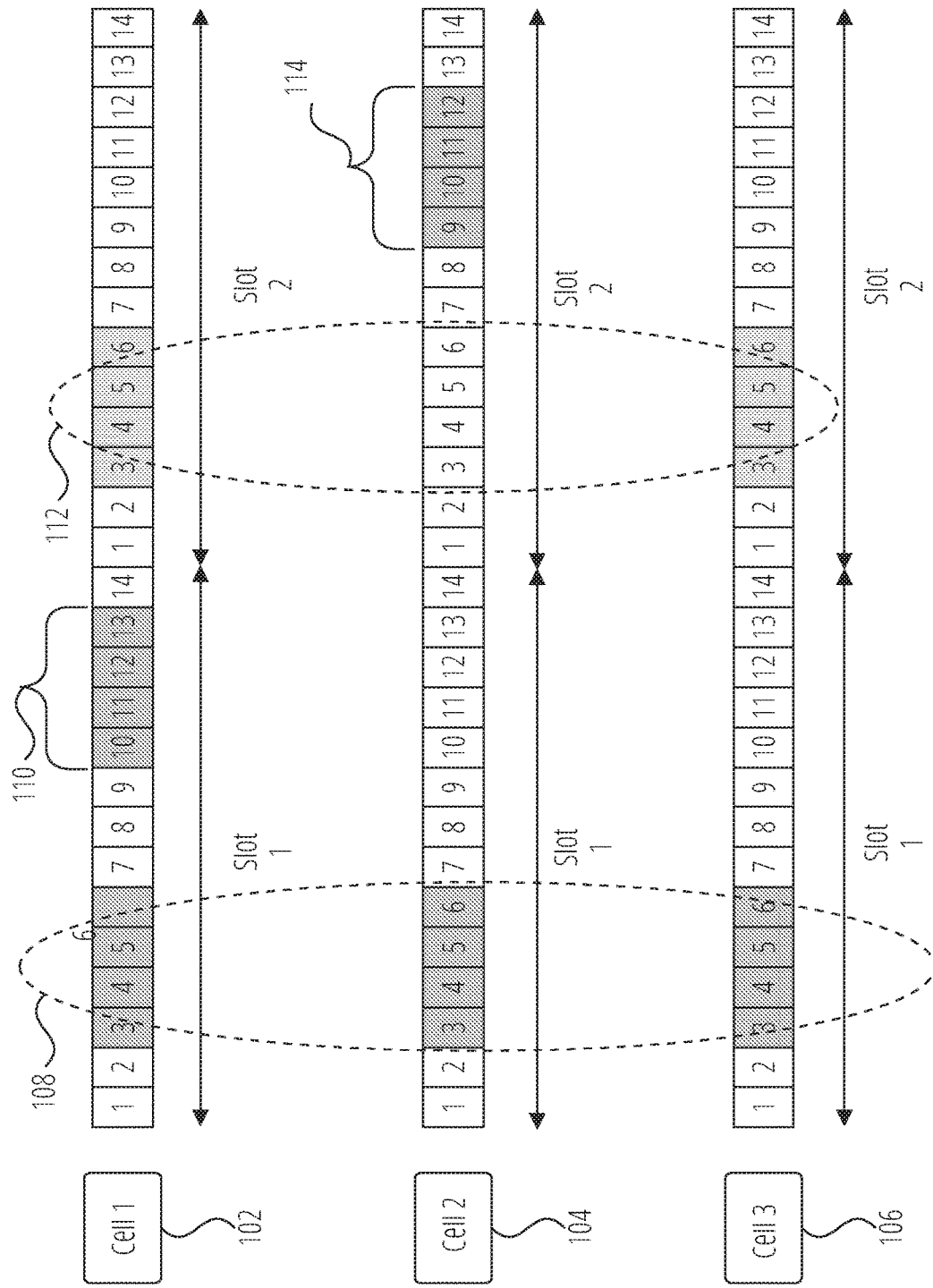
FIG. 1 illustrates an example of overlapping SSBs of different cells in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, 3gPP Release 17 (Rel-17) has plans to support both inter-cell beam management (also referred to herein as BM) and inter-cell multi-transmission and reception points (TRPs). For inter-cell beam management, base stations (e.g., gNBs) may provide a transmission configuration indicator (TCI) associated with a neighbor cell synchronization signal block (SSB) for uplink and downlink signals. Notably, TCIs may be used for beam indication and can be based on a media access control (MAC) control element (CE) or downlink control information (DCI). In addition, a UE may not have to simultaneously communicate (e.g., simultaneously transmit or receive) with more than one cell.

For inter-cell multi-TRP operation, a base station (e.g., gNB) can provide TCIs associated with SSBs from different cells for signals associated with different control resource set (CORESET) pool indexes (CORESETPoolIndex(es)). Notably, signals associated with one CORESETPoolIndex may be associated with a single cell and UEs may have to simultaneously communicate with more than one cell. CORESETS may be utilized for physical downlink control channel (PDCCH) configuration. In addition, CORESET pool indexes may each be associated with a particular TRP.

In 3GPP Release 16 (Rel-16), with regard to dynamic spectrum sharing between LTE and NR, rate matching in NR may include consideration of LTE cell-specific reference signals (CRSs). In particular, a base station (e.g., a gNB) can provide a list of CRS patterns via radio resource control (RRC) signaling for rate matching purposes (see e.g., Section 6.3.2 of 3GPP Technical Specification (TS) 38.331). In addition, resource elements corresponding to a configured CRS pattern may be considered to be "not available" for rate matching purposes.

For single-TRP operation, a base station (e.g., a gNB) can provide one list of CRS patterns while for multi-TRP operation, a base station can provide two lists of CRS patterns, where each list is associated with a single TRP. For instance, the following may apply:

```
RateMatchPatternLTE-CRS ::=    SEQUENCE {
    carrierFreqDL              INTEGER (0..16383),
    carrierBandwidthDL         ENUMERATED {n6, n15, n25, n50, n75, n100,
spare2, spare1},
    mbsfn-SubframeConfigList   EUTRA-MBSFN-SubframeConfigList
OPTIONAL, -- Need M
    nrofCRS-Ports              ENUMERATED {n1, n2, n4},
    v-Shift                    ENUMERATED {n0, n1, n2, n3, n4, n5}
}
```

To measure beam quality, a UE can report Layer 1 Reference Signal Received Power (L1-RSRP) for a subset of SSBs among a list of SSBs from one or more neighbor cell(s). Regarding which, the following may apply: 1. UEs may be configured to measure SSBs from multiple cells; 2. SSBs from multiple cells may be multiplexed in a fully-overlapped pattern; 3. Base stations (e.g., gNBs) can configure time domain measurement restrictions for SSBs (see e.g., Section 5.2.1.4.3 of 3GPP TS 38.514), including: a. If a higher layer parameter referred to as timeRestrictionForChannelMeasurements in a channel state information (CSI) report configuration (CSI-ReportConfig) is set to "notConfigured," a UE may derive channel measurements for computing L1-RSRP values reported in an uplink slot n based on a synchronization signal/physical broadcast channel (SS/PBCH) or a non-zero power (NZP) CSI-reference signal (CSI-RS), no later than a CSI reference resource (see e.g., 3GPP TS 38.211[4]) associated with the CSI resource setting; or b. If the higher layer parameter timeRestrictionForChannelMeasurements in CSI-ReportConfig is set to "Configured", the UE may derive channel measurements for computing L1-RSRP reported in an uplink slot n based on a most recent (and no later than the CSI reference resource) occasion of an SS/PBCH or an NZP CSI-RS (see e.g., 3GPP TS 38.211[4]) associated with the CSI resource setting; and 3. A reported L1-RSRP may follow a minimal processing delay $Z=Z3$ and $Z'=Z3'$ (see e.g., Section 5.4 3GPP TS 38.414], where: a. Z is a minimal offset between a last symbol of a DCI triggering an L1-RSRP report and a first symbol of the L1-RSRP report; and b. Z' is a minimal offset between a last symbol of an SSB and a first symbol of the L1-RSRP report.

In addition, the following related issues may remain: 1. For inter-cell BM and inter-cell multi-TRP operation, a base station can configure up to seven cells for each component carrier (CC), where a corresponding LTE CRS pattern for each such cell may be different. Accordingly, up to eight LTE CRS patterns may be applicable when including the serving cell. Such scenarios may create great complexity and the manner in which to support such cell-specific CRS patterns is currently unresolved; and 2. SSBs from different cells may be multiplexed in overlapping resources (see FIG. 1 for more details), which may cause a UEs complexity in measuring L1-RSRP from SSBs with overlapped resources in comparison to non-overlapped resources to be quite different. The manner in which networks can support such scenarios (e.g., supporting different beam report latency for different overlapping cases) also remains unresolved. Accordingly, the principles and solutions described herein may assist in resolving such issues.

As briefly referred to above, FIG. 1 illustrates slots (i.e., slot1 and slot 2) and SSBs of three different cells (i.e., cell 1 102, cell 2 104, and cell 3 106). As represented by ellipse 108, a first SSB (or SSB1) associated with each of cell 1 102, cell 2 104, and cell 3 106 may include overlapping resources. Similarly, as represented by ellipse 112, a third SSB (or SSB3) associated with cell 1 102 and cell 3 106 may also include overlapping resources. Again, such overlapping resources between SSBs of separate cells may create additional complexity in measuring L1-RSRP corresponding to such SSBs. As shown, FIG. 1 also includes SSB2 110 corresponding to cell 1 102 and SSB4 114 corresponding to cell 2 104, neither of which include any overlapping resources.

In a first solution, various options may be utilized to support cell-specific LTE CRS pattern lists. For instance, in a first option, a base station (e.g., a gNB) can configure an LTE CRS pattern list for each cell of a potential plurality of cells via RRC. In particular, for N cells, a base station may provide N LTE CRS pattern lists. In some embodiments, however, a base station may share less than N LTE CRS pattern lists with respect to N cells (e.g., when some of the N cells share a same LTE CRS pattern). In scenarios where a CRS pattern is not provided, a CRS pattern list of a corresponding serving cell can be reused (or rate matching for LTE CRS may simply be ignored).

With respect to the first option, for downlink signals having an indication of the TCI State associated with the cell, the corresponding CRS pattern is considered for rate matching. For downlink signals without TCI indicated, however, the following three options may be utilized: a. The LTE CRS pattern list configured for the serving cell is used for rate matching; b. The LTE CRS pattern list configured for the cell associated with a TCI applied for a dedicated physical downlink shared channel (PDSCH) is used for rate matching. For inter-cell multi-TRP, this option may include the dedicated physical downlink control channel (PDCCH)/PDSCH indicating the PDCCH/PDSCH associated with CORESETPoolIndex=0; or c. No LTE CRS pattern is considered for rate matching (e.g., when there is no LTE deployed in the same location as the cell).

In a second option of the first solution, an LTE CRS pattern list can be updated by MAC CE. In a first example, a base station may initially provide a set of LTE CRS pattern lists by RRC signaling. In such cases, a MAC CE can then indicate a particular LTE CRS pattern list from the set of LTE CRS pattern lists to be used for a CORESETPoolIndex (i.e., for inter-cell multi-TRP) or for a CC. In a second example, a base station again may initially provide an LTE CRS pattern list by RRC signaling. The configuration for each parameter may then be updated by MAC CE.

In a third option of the first solution, an LTE CRS pattern list can be further refined by scheduling DCI. In a first example, a base station may provide a set of LTE CRS pattern lists by RRC signaling, further refine the set of lists via MAC CE, and indicate one of the LTE CRS pattern lists from the set of lists refined by MAC CE via DCI. In a second example, a base station may provide a set of LTE CRS pattern lists by RRC and then use DCI to indicate one particular LTE CRS pattern list from the set of LTE CRS pattern lists.

Figure 2:
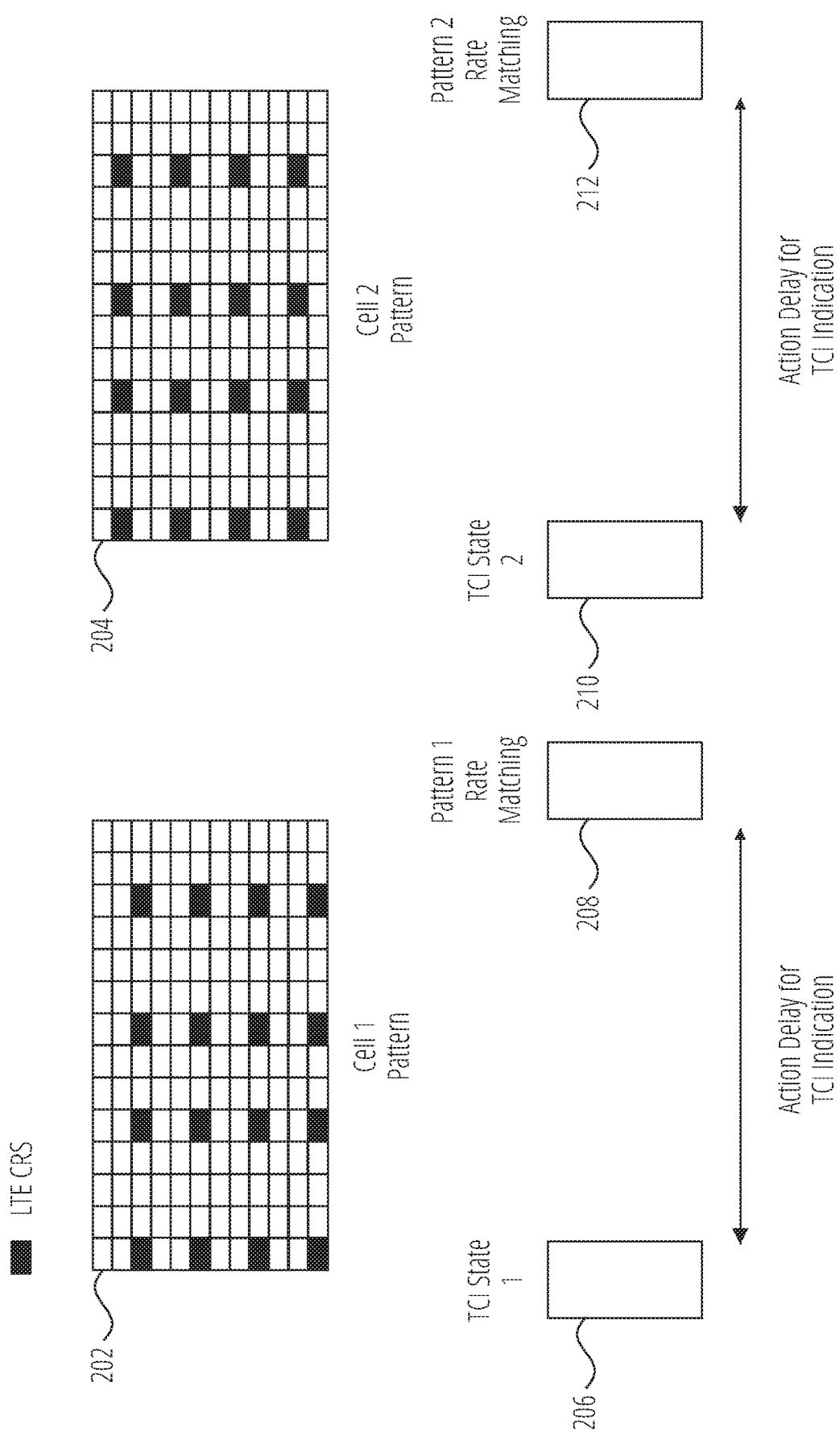
FIG. 2 illustrates an example of cell-specific CRS patterns and corresponding TCI state indications in accordance with one embodiment.

FIG. 2 illustrates an example for cell-specific CRS patterns and corresponding TCI indications. As shown, FIG. 2 includes an LTE CRS pattern 202 associated with a first cell and an LTE CRS pattern 204 associated with a second cell. Upon receiving a first TCI state indication (i.e., TCI state 1 206) corresponding to the first cell, rate matching may be performed based on the LTE CRS pattern 202 (as represented by pattern 1 rate matching 208) after an action delay. Similarly, upon receiving a second TCI state indication (i.e., TCI state 2 210) corresponding to the second cell, rate matching may be performed based on the LTE CRS pattern 204 (as represented by pattern 2 rate matching 212).

Further enhancements to general rate matching patterns for each cell (associated with the first solution) will now be discussed. In an example, with regard to different configurations for different cells, a rate matching pattern (RateMatchingPattern) or rate matching group (RateMatchingGroup) may be provided in a cell-specific manner. In fact, the first, second, and third options of the first solution may be used for rate matching patterns and rate matching group determinations and configurations. For instance, in a scheduling DCI, a corresponding rate matching group for a given cell may be selected. Notably, RateMatchingPattern and RateMatchingGroup are defined in Section 6.3.2 of 3GPP TS 38.331.

In another enhancement, with regard to different configuration for different cells, a scrambling identification (ID) may also be configured in a cell-specific manner. As such, the first, second, and third options of the first solution may again be used to support cell-specific scrambling IDs (e.g. dataScramblingIdentityPDSCH). In an example, when a scrambling ID is not provided, a corresponding cell ID may be used for data scrambling, which cell ID may be determined based on a cell associated with an indicated TCI State for the downlink signal.

In yet another enhancement, with regard to UE memory management, a UE can report a maximum number of rate matching patterns and/or LTE CRS pattern lists across configured cells as a UE capability. Alternatively, a UE can report a maximum number of neighbor cells with different rate matching patterns or LTE CRS pattern lists it can support in comparison to a serving cell's rate matching patterns.

In a second solution, various options may be utilized for minimal measurement delay with respect to overlapped SSBs. For instance, in a first option, a minimal delay for Z and Z' may be Z3+d and Z3'+d, where d can be predefined (e.g., d is determined by a number of overlapped SSB symbols(S) or S*ceiling $\{(N-1)/K\}$, where N is a number of overlapped SSBs and K indicates a number of SSBs that a UE can simultaneously receive (which may be predefined (e.g., K=1) or reported by UE capability)). When there are multiple overlapping occasions, d may be counted based on a total number of d for all the occasions or a maximum number of d for all the occasions. For example, in FIG. 1, to report L1-RSRP for all the SSBs, d=4*2+0+4+0=12 symbols or d=max $\{4*2, 0, 4, 0\}$=8 symbols (i.e., 4*2 based on the two additional overlapping SSBs of ellipse 108, 4 based on the one additional overlapping SSB of ellipse 112 and two 0's based on SSB2 110 and SSB4 114 not including any additional overlapping SSBs).

In another example, a scaling factor S maybe introduced to calculate a value of 'd'. For instance, d=S*Z_3*N, where N is a number of overlapped SSBs. In such embodiments, the value of S maybe hard-encoded in the specification or reported in a UE capability report. This embodiment may be useful in some instances by the fact that some of baseband processing steps are shared for multiple SSBs that are measured by UE.

In an enhancement of the first option, for Frequency Range 2 (FR2) with regard to UE beam sweeping, d may be defined in terms of an SSB periodicity level. For example, d may be determined by SSB periodicity (T) or T*(N−1). Alternatively, d may be reported based on UE capability.

In a second option of the second solution, measurements may take ceiling $\{N/K\}$ CSI processing units (CPUs), where N is a number of overlapped SSBs and K indicates a number of SSBs that a UE can simultaneously receive (which may be predefined (e.g., K=1) or reported by UE capability)), resulting in a minimal delay of Z=Z3 and Z'=Z3' (CPU is defined in Section 5.2.1.6 of 3GPP TS 38.514). Notably, such embodiments include an assumption that UEs would process the measurement of overlapped SSBs in a parallel processing mode.

In a third option of the second solution, whether the first option or the second option of the second solution is utilized may be reported by UE capability. For instance, such determinations may be based on whether a given UE is capable of parallel processing. For UEs that can support both options, an RRC parameter may be introduced for option selection. In addition, a UE may report/update which option it prefers via MAC CE, followed by a base station RRC reconfiguration.

In a fourth option of the second solution, a UE can report a capability of a maximum number of overlapped SSBs it can support for L1-RSRP measurement. The base station's configuration may then be based on the reported UE capability, resulting in a minimal processing delay of Z=Z3 and Z'=Z3'.

For other measurements (e.g., beam failure detection (BFD), radio link monitoring (RLM), and so forth), overlapped SSBs may be used for similar or different functionalities (e.g., a first is configured for BFD and a second is configured for L1-RSRP measurement).

An evaluation periodicity for such other measurements (e.g., BFD, RLM, and so forth) may be scaled in accordance with various options. For instance, in a first option, such scaling factor may be predefined. In a first example, the periodicity for an SSB for BFD/RLM (or other measurements) may be Xms*(N−1), where X indicates the periodicity without overlapped SSBs. In a second example, the periodicity for an SSB for BFD/RLM (or other measurements) could be Xms*ceiling $\{(N-1)/K\}$, where X indicates the periodicity without overlapped SSBs. Regardless, an overall periodicity for BFD/RLM (or other measurements) may be determined by a minimum periodicity or maximum periodicity for the SSBs configured for BFD/RLM (or other measurements).

In a second option, such scaling factor may be reported by UE capability. For instance, an RRC parameter may be introduced to configure the scaling factor based on UE capability.

Figure 3:
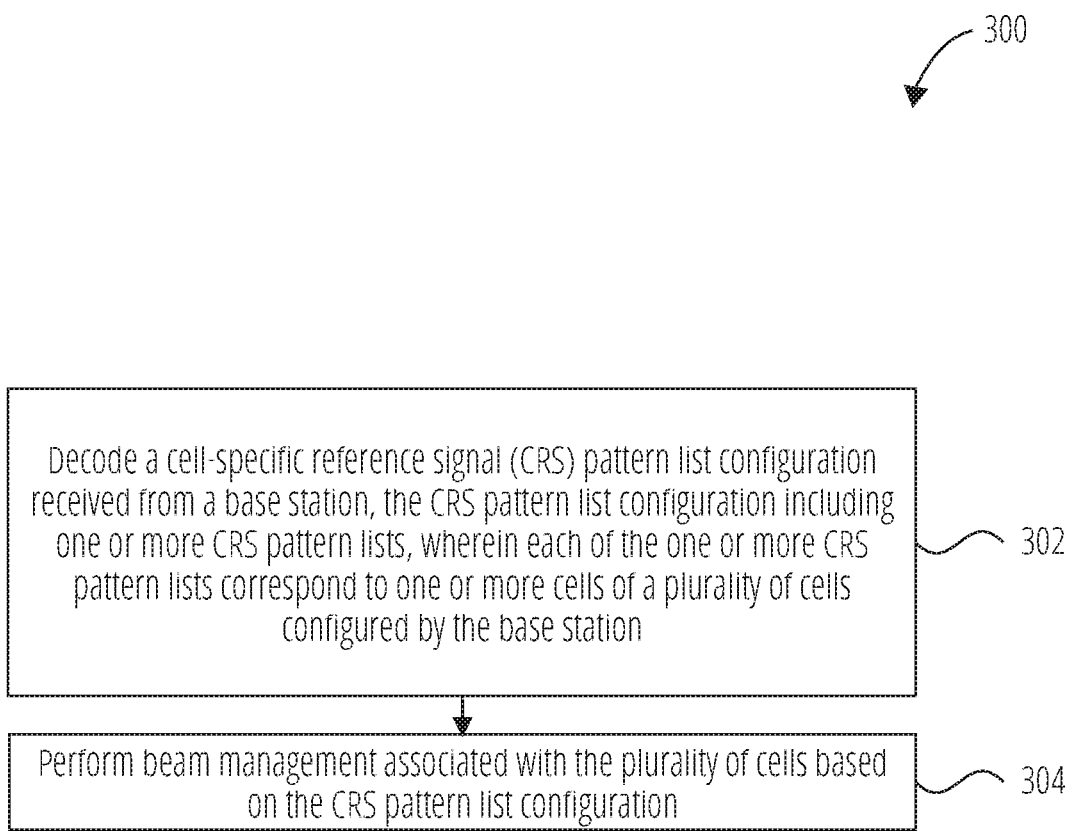
FIG. 3 illustrates a method for inter-cell beam management and inter-cell multi-TRP operation in accordance with one embodiment.

FIG. 3 illustrates a method for inter-cell beam management/inter-cell multi-TRP operation. In block 302, the method 300 decodes a cell-specific reference signal (CRS) pattern list configuration received from a base station. The CRS pattern list configuration may include one or more CRS pattern lists. In addition, each of the one or more CRS pattern lists may correspond to one or more cells of a plurality of cells configured by the base station. In block 304, the method 300 performs beam management associated with the plurality of cells based on the CRS pattern list configuration. For instance, such CRS pattern list configuration may include CRS patterns similar to LTE CRS pattern 202 of FIG. 2.

The method 300 may also include performing beam management including at least one of performing Layer 1-Reference Signal Received Power (L1-RSRP) measurements and rate matching corresponding to a first cell of the plurality of cells. The method 300 may also include decoding a transmission configuration indicator (TCI) state indication associated with a downlink signal of a first cell of the plurality of cells, and performing rate matching based at least partially on a CRS pattern corresponding to the first cell. The CRS pattern may be included within the one or more CRS pattern lists.

The method 300 may further include the plurality of cells configured by the base station comprising seven cells and the one or more CRS pattern lists comprising eight CRS pattern lists. The method 300 may further include determining that a downlink signal of a first cell of the plurality of cells does not include an associated transmission configuration indicator (TCI) state indication.

The method 300 may further include, based on determining that the downlink signal of the first cell does not include an associated transmission configuration indicator (TCI) state indication, performing rate matching based at least partially on a first CRS pattern list configured for a current serving cell of the UE, or performing rate matching based on a second CRS pattern list associated with a cell corresponding to a TCI for a dedicated physical downlink shared channel (PDSCH).

The method 300 may further include the CRS pattern list configuration being provided by radio resource configuration (RRC). The method 300 may also include updating at least one of the one or more CRS pattern lists via a medium access control (MAC) control element (CE). The method 300 may further include decoding downlink control information (DCI) indicating a first CRS pattern list from the one or more CRS pattern lists.

The method 300 may further include decoding scheduling downlink control information (DCI) indicating a rate matching group associated with the CRS pattern list configuration. The method 300 may further include decoding a UE capability communication for transmission to the base station. The UE capability communication may indicate a maximum number of CRS pattern lists associated with the plurality of cells configured by the base station.

The method 300 may further include identifying overlapping synchronization signal blocks (SSBs) between multiple cells of the plurality of cells configured by the base station. The method 300 may further include the overlapping SSBs between multiple cells of the plurality of cells comprising a first set of SSBs associated with a first cell of the plurality of cells and a second set of SSBs associated with a second cell of the plurality of cells. The first set of SSBs may be configured for beam failure detection (BFD) and the second set of SSBs may be configured for Layer 1-Reference Signal Received Power (L1-RSRP) measurements.

The method 300 may further include an evaluation periodicity associated with BFD including a scaling factor. The method 300 may also include the scaling factor being either pre-defined or reported by the UE as a UE capability. The method 300 may further include identifying overlapping synchronization signal blocks (SSBs) between multiple cells of the plurality of cells configured by the base station.

The method 300 may further include a minimum measurement delay associated with performing beam management including consideration of a number of overlapping synchronization signal blocks (SSBs) between multiple cells of the plurality of cells configured by the base station. The method 300 may further include the minimum measurement delay further including consideration of a number of overlapping SSB symbols and a maximum number of SSBs that the UE is configured to receive simultaneously.

The method 300 may also include the minimum measurement delay further including consideration of an SSB periodicity level for beam sweeping in Frequency Range 2 (FR2). The method 300 may further include, when the UE is configured to process overlapping SSB measurements in parallel, a duration of performing measurements comprising a number of channel state information (CSI) processing units. The number may be calculated based on a number of overlapping SSB symbols and a maximum number of SSBs that the UE is configured to receive simultaneously.

The method 300 may further include encoding a UE capability report for transmission to the base station, the UE capability report including an indication of parallel processing capabilities of the UE.

The method 300 may further include encoding a UE capability report for transmission to the base station. The UE capability report may include an indication of a maximum number of overlapping SSBs the UE supports for Layer 1-Reference Signal Received Power (L1-RSRP) measurements.

Embodiments contemplated herein include an apparatus comprising means to perform one or more elements of the method 300. This apparatus may be, for example, an apparatus of a UE (such as a wireless device 502 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 506 of a wireless device 502 that is a UE, as described herein).

Embodiments contemplated herein include an apparatus comprising logic, modules, or circuitry to perform one or more elements of the method 300. This apparatus may be, for example, an apparatus of a UE (such as a wireless device 502 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 502 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 504 of a wireless device 502 that is a UE, as described herein). These instructions may be, for example, located in the processor and/or on a memory of the UE (such as a memory 506 of a wireless device 502 that is a UE, as described herein).

Figure 4:
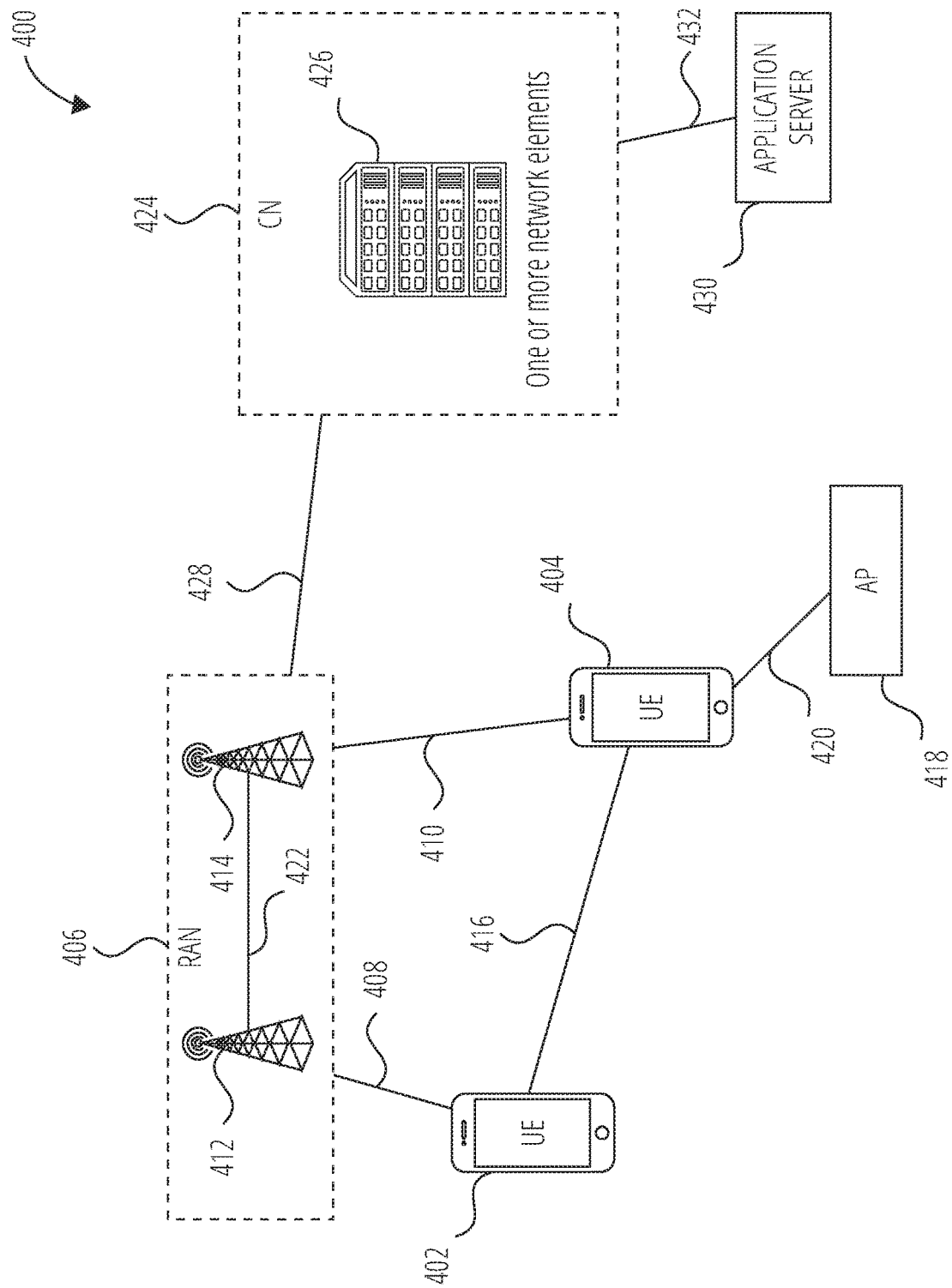
FIG. 4 illustrates an example architecture of a wireless communication system, according to embodiments disclosed herein.

FIG. 4 illustrates an example architecture of a wireless communication system 400, according to embodiments disclosed herein. The following description is provided for an example wireless communication system 400 that operates in conjunction with the LTE system standards and/or 5G or NR system standards as provided by 3GPP technical specifications.

As shown by FIG. 4, the wireless communication system 400 includes UE 402 and UE 404 (although any number of UEs may be used). In this example, the UE 402 and the UE 404 are illustrated as smartphones (e.g., handheld touch-screen mobile computing devices connectable to one or more cellular networks), but may also comprise any mobile or non-mobile computing device configured for wireless communication.

The UE 402 and UE 404 may be configured to communicatively couple with a RAN 406. In embodiments, the RAN 406 may be NG-RAN, E-UTRAN, etc. The UE 402 and UE 404 utilize connections (or channels) (shown as connection 408 and connection 410, respectively) with the RAN 406, each of which comprises a physical communications interface. The RAN 406 can include one or more base stations, such as base station 412 and base station 414, that enable the connection 408 and connection 410.

In this example, the connection 408 and connection 410 are air interfaces to enable such communicative coupling, and may be consistent with RAT(s) used by the RAN 406, such as, for example, an LTE and/or NR.

In some embodiments, the UE 402 and UE 404 may also directly exchange communication data via a sidelink interface 416. The UE 404 is shown to be configured to access an access point (shown as AP 418) via connection 420. By way of example, the connection 420 can comprise a local wireless connection, such as a connection consistent with any IEEE 802.11 protocol, wherein the AP 418 may comprise a Wi-Fi® router. In this example, the AP 418 may be connected to another network (for example, the Internet) without going through a CN 424.

In embodiments, the UE 402 and UE 404 can be configured to communicate using orthogonal frequency division multiplexing (OFDM) communication signals with each other or with the base station 412 and/or the base station 414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 412 or base station 414 may be implemented as one or more software entities running on server computers as part of a virtual network. In addition, or in other embodiments, the base station 412 or base station 414 may be configured to communicate with one another via interface 422. In embodiments where the wireless communication system 400 is an LTE system (e.g., when the CN 424 is an EPC), the interface 422 may be an X2 interface. The X2 interface may be defined between two or more base stations (e.g., two or more eNBs and the like) that connect to an EPC, and/or between two eNBs connecting to the EPC. In embodiments where the wireless communication system 400 is an NR system (e.g., when CN 424 is a 5GC), the interface 422 may be an Xn interface. The Xn interface is defined between two or more base stations (e.g., two or more gNBs and the like) that connect to 5GC, between a base station 412 (e.g., a gNB) connecting to 5GC and an eNB, and/or between two eNBs connecting to 5GC (e.g., CN 424).

The RAN 406 is shown to be communicatively coupled to the CN 424. The CN 424 may comprise one or more network elements 426, which are configured to offer various data and telecommunications services to customers/subscribers (e.g., users of UE 402 and UE 404) who are connected to the CN 424 via the RAN 406. The components of the CN 424 may be implemented in one physical device or separate physical devices including components to read and execute instructions from a machine-readable or computer-readable medium (e.g., a non-transitory machine-readable storage medium).

In embodiments, the CN 424 may be an EPC, and the RAN 406 may be connected with the CN 424 via an S1 interface 428. In embodiments, the S1 interface 428 may be split into two parts, an S1 user plane (S1-U) interface, which carries traffic data between the base station 412 or base station 414 and a serving gateway (S-GW), and the S1-MME interface, which is a signaling interface between the base station 412 or base station 414 and mobility management entities (MMEs).

In embodiments, the CN 424 may be a 5GC, and the RAN 406 may be connected with the CN 424 via an NG interface 428. In embodiments, the NG interface 428 may be split into two parts, an NG user plane (NG-U) interface, which carries traffic data between the base station 412 or base station 414 and a user plane function (UPF), and the S1 control plane (NG-C) interface, which is a signaling interface between the base station 412 or base station 414 and access and mobility management functions (AMFs).

Generally, an application server 430 may be an element offering applications that use internet protocol (IP) bearer resources with the CN 424 (e.g., packet switched data services). The application server 430 can also be configured to support one or more communication services (e.g., VoIP sessions, group communication sessions, etc.) for the UE 402 and UE 404 via the CN 424. The application server 430 may communicate with the CN 424 through an IP communications interface 432.

Figure 5:
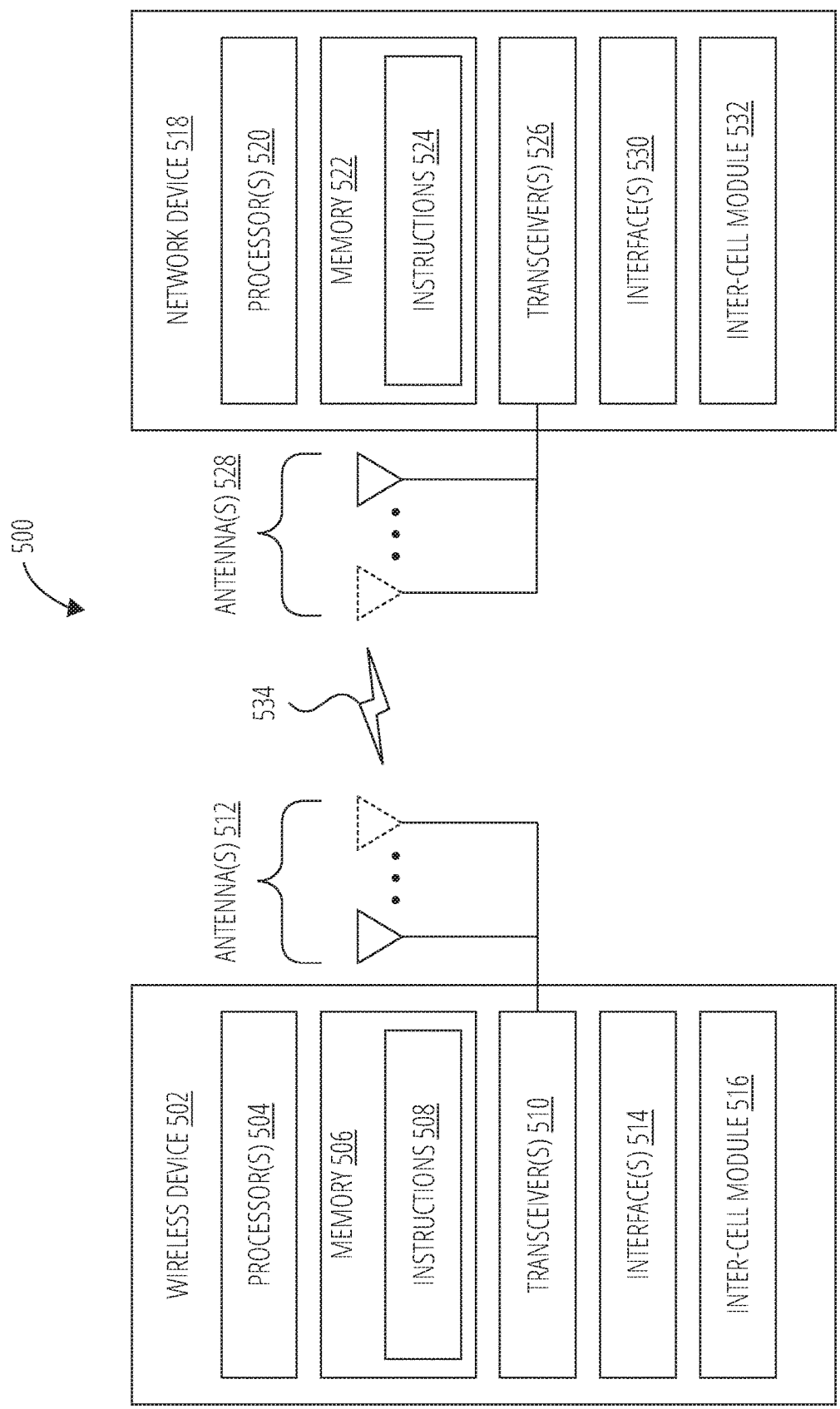
FIG. 5 illustrates a system for performing signaling between a wireless device and a network device, according to embodiments disclosed herein.

FIG. 5 illustrates a system 500 for performing signaling 534 between a wireless device 502 and a network device 518, according to embodiments disclosed herein. The system 500 may be a portion of a wireless communications system as herein described. The wireless device 502 may be, for example, a UE of a wireless communication system. The network device 518 may be, for example, a base station (e.g., an eNB or a gNB) of a wireless communication system.

The wireless device 502 may include one or more processor(s) 504. The processor(s) 504 may execute instructions such that various operations of the wireless device 502 are performed, as described herein. The processor(s) 504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 502 may include a memory 506. The memory 506 may be a non-transitory computer-readable storage medium that stores instructions 508 (which may include, for example, the instructions being executed by the processor(s) 504). The instructions 508 may also be referred to as program code or a computer program. The memory 506 may also store data used by, and results computed by, the processor(s) 504.

The wireless device 502 may include one or more transceiver(s) 510 that may include radio frequency (RF) transmitter and/or receiver circuitry that use the antenna(s) 512 of the wireless device 502 to facilitate signaling (e.g., the signaling 534) to and/or from the wireless device 502 with other devices (e.g., the network device 518) according to corresponding RATs.

The wireless device 502 may include one or more antenna(s) 512 (e.g., one, two, four, or more). For embodiments with multiple antenna(s) 512, the wireless device 502 may leverage the spatial diversity of such multiple antenna(s) 512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 502 may be accomplished according to precoding (or digital beamforming) that is applied at the wireless device 502 that multiplexes the data streams across the antenna(s) 512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 502 may implement analog beamforming techniques, whereby phases of the signals sent by the antenna(s) 512 are relatively adjusted such that the (joint) transmission of the antenna(s) 512 can be directed (this is sometimes referred to as beam steering).

The wireless device 502 may include one or more interface(s) 514. The interface(s) 514 may be used to provide input to or output from the wireless device 502. For example, a wireless device 502 that is a UE may include interface(s) 514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 510/antenna(s) 512 already described) that allow for communication between the UE and other devices and may operate according to known protocols (e.g., Wi-Fi®, Bluetooth®, and the like).

The wireless device 502 may include an Inter-cell module 516. The Inter-cell module 516 may be implemented via hardware, software, or combinations thereof. For example, the Inter-cell module 516 may be implemented as a processor, circuit, and/or instructions 508 stored in the memory 506 and executed by the processor(s) 504. In some examples, the Inter-cell module 516 may be integrated within the processor(s) 504 and/or the transceiver(s) 510. For example, the Inter-cell module 516 may be implemented by a combination of software components (e.g., executed by a DSP or a general processor) and hardware components (e.g., logic gates and circuitry) within the processor(s) 504 or the transceiver(s) 510.

The Inter-cell module 516 may be used for various aspects of the present disclosure, for example, aspects of FIGS. 1 through 3. The Inter-cell module 516 is configured to assist with inter-cell beam management and inter-cell multi-TRP operation, as further described herein.

The network device 518 may include one or more processor(s) 520. The processor(s) 520 may execute instructions such that various operations of the network device 518 are performed, as described herein. The processor(s) 520 may include one or more baseband processors implemented using, for example, a CPU, a DSP, an ASIC, a controller, an FPGA device, another hardware device, a firmware device, or any combination thereof configured to perform the operations described herein.

The network device 518 may include a memory 522. The memory 522 may be a non-transitory computer-readable storage medium that stores instructions 524 (which may include, for example, the instructions being executed by the processor(s) 520). The instructions 524 may also be referred to as program code or a computer program. The memory 522 may also store data used by, and results computed by, the processor(s) 520.

The network device 518 may include one or more transceiver(s) 526 that may include RF transmitter and/or receiver circuitry that use the antenna(s) 528 of the network device 518 to facilitate signaling (e.g., the signaling 534) to and/or from the network device 518 with other devices (e.g., the wireless device 502) according to corresponding RATs.

The network device 518 may include one or more antenna(s) 528 (e.g., one, two, four, or more). In embodiments having multiple antenna(s) 528, the network device 518 may perform MIMO, digital beamforming, analog beamforming, beam steering, etc., as has been described.

The network device 518 may include one or more interface(s) 530. The interface(s) 530 may be used to provide input to or output from the network device 518. For example, a network device 518 that is a base station may include interface(s) 530 made up of transmitters, receivers, and other circuitry (e.g., other than the transceiver(s) 526/antenna(s) 528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 518 may include an inter-cell module 532. The inter-cell module 532 may be implemented via hardware, software, or combinations thereof. For example, the inter-cell module 532 may be implemented as a processor, circuit, and/or instructions 524 stored in the memory 522 and executed by the processor(s) 520. In some examples, the inter-cell module 532 may be integrated within the processor(s) 520 and/or the transceiver(s) 526. For example, the inter-cell module 532 may be implemented by a combination of software components (e.g., executed by a DSP or a general processor) and hardware components (e.g., logic gates and circuitry) within the processor(s) 520 or the transceiver(s) 526.

The inter-cell module 532 may be used for various aspects of the present disclosure, for example, aspects of FIGS. 1 through 3. The inter-cell module 532 is configured to assist with inter-cell beam management and inter-cell multi-TRP operation, as further described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for inter-cell beam management and inter-cell multiple transmission and reception point (multi-TRP) operation at a user equipment (UE), the method comprising:
   decoding a cell-specific reference signal (CRS) pattern list configuration received from a base station, the CRS pattern list configuration including one or more CRS pattern lists, wherein each of the one or more CRS pattern lists correspond to one or more cells of a plurality of cells configured by the base station; and
   performing beam management associated with the plurality of cells based on the CRS pattern list configuration.

2. The method of claim 1, wherein performing beam management includes at least one of performing Layer 1-Reference Signal Received Power (L1-RSRP) measurements and rate matching corresponding to a first cell of the plurality of cells.

3. The method of claim 2, further comprising:
   decoding a transmission configuration indicator (TCI) state indication associated with a downlink signal of the first cell of the plurality of cells; and
   performing rate matching based at least partially on a CRS pattern corresponding to the first cell, the CRS pattern being included within the one or more CRS pattern lists.

4. The method of claim 1, wherein the plurality of cells configured by the base station comprises seven cells and the one or more CRS pattern lists comprise eight CRS pattern lists.

5. The method of claim 1, further comprising determining that a downlink signal of a first cell of the plurality of cells does not include an associated transmission configuration indicator (TCI) state indication.

6. The method of claim 1, further comprising:
   based on determining that a downlink signal of a first cell of the plurality of cells does not include an associated transmission configuration indicator (TCI) state indication, performing the following:
      performing rate matching based at least partially on a first CRS pattern list configured for a current serving cell of the UE; or
      performing rate matching based on a second CRS pattern list associated with a cell corresponding to a TCI for a dedicated physical downlink shared channel (PDSCH).

7. The method of claim 1, wherein the CRS pattern list configuration is provided by radio resource configuration (RRC).

8. The method of claim 1, further comprising updating at least one of the one or more CRS pattern lists via a medium access control (MAC) control element (CE).

9. The method of claim 1, further comprising decoding downlink control information (DCI) indicating a first CRS pattern list from the one or more CRS pattern lists.

10. The method of claim 1, further comprising decoding scheduling downlink control information (DCI) indicating a rate matching group associated with the CRS pattern list configuration.

11. A user equipment (UE) comprising:
    a processor; and
    a memory storing instructions that, when executed by the processor, configure the UE to:
       decode a cell-specific reference signal (CRS) pattern list configuration received from a base station, the CRS pattern list configuration including one or more CRS pattern lists, wherein each of the one or more CRS pattern lists correspond to one or more cells of a plurality of cells configured by the base station; and perform beam management associated with the plurality of cells based on the CRS pattern list configuration.

12. The UE of claim 11, wherein the memory stores additional instructions that, when executed by the processor, configure the UE to decode a UE capability communication for transmission to the base station, the UE capability communication indicating a maximum number of CRS pattern lists associated with the plurality of cells configured by the base station.

13. The UE of claim 11, wherein the memory stores additional instructions that, when executed by the processor, configure the UE to identify overlapping synchronization signal blocks (SSBs) between multiple cells of the plurality of cells configured by the base station.

14. The UE of claim 13, wherein the overlapping SSBs between multiple cells of the plurality of cells comprise a first set of SSBs associated with a first cell of the plurality of cells and a second set of SSBs associated with a second cell of the plurality of cells, the first set of SSBs being configured for beam failure detection (BFD) and the second set of SSBs being configured for Layer 1-Reference Signal Received Power (L1-RSRP) measurements.

15. The UE of claim 14, wherein an evaluation periodicity associated with the BFD includes a scaling factor.

16. The UE of claim 15, wherein the scaling factor is either pre-defined or reported by the UE as a UE capability.

17. A non-transitory computer-readable storage medium, the computer-readable storage medium including instructions that when executed by a processor of a user equipment (UE), cause the UE to:

decode a cell-specific reference signal (CRS) pattern list configuration received from a base station, the CRS pattern list configuration including one or more CRS pattern lists, wherein each of the one or more CRS pattern lists correspond to one or more cells of a plurality of cells configured by the base station; and perform beam management associated with the plurality of cells based on the CRS pattern list configuration.

18. The non-transitory computer-readable storage medium of claim 17, wherein the computer-readable storage medium includes additional instructions that when executed by the processor of the UE, cause the UE to identify overlapping synchronization signal blocks (SSBs) between multiple cells of the plurality of cells configured by the base station.

19. The non-transitory computer-readable storage medium of claim 18, wherein a minimum measurement delay associated with performing the beam management includes consideration of a number of the overlapping SSBs between the multiple cells of the plurality of cells configured by the base station.

20. The non-transitory computer-readable storage medium of claim 19, wherein the minimum measurement delay further includes consideration of a number of overlapping SSB symbols and a maximum number of SSBs that the UE is configured to receive simultaneously.

* * * * *